United States Patent Office 3,739,042
Patented June 12, 1973

3,739,042
BLOCK COPOLYMERS OF ANIONICALLY POLYMERIZED AND FREE RADICAL POLYMERIZED MONOMERS

Nan S. Chu, Hartsdale, N.Y., and James L. Jezl, Swarthmore, Pa., assignors to Standard Oil Company, Chicago, Ill.

No Drawing. Continuation-in-part of application Ser. No. 529,216, Feb. 23, 1966. This application Oct. 6, 1969, Ser. No. 864,204

Int. Cl. C08f 15/04

U.S. Cl. 260—878 B                    20 Claims

ABSTRACT OF THE DISCLOSURE

Block copolymers are provided having at least two blocks, the first such blocks being a homopolymer or copolymer of a hydrocarbon selected from the group consisting of alpha-olefins having up to 18 carbon atoms and diolefins and at least one of the other blocks being a homopolymer or copolymer obtained from at least one other monomer such as acrylic and methacrylic esters, amides, and nitriles; vinyl halides; vinylidene halides; vinyl ethers and esters; vinylpyridines and alkylvinylpyridines; N-vinyl lactams; styrenes and alkyl styrenes and mixtures thereof.

RELATED APPLICATIONS

This application is a continuation-in-part of U.S. pat. application Ser. No. 529,216, filed Feb. 23, 1966, now abandoned.

DESCRIPTION OF THE INVENTION

This invention relates to block copolymers formed from monomers which polymerize by an anionic mechanism and monomers which polymerize by a free radical mechanism. For purposes of convenience, the materials of this invention will be designated AFR (anionic free radical) polymers.

A wide range of polymers of both types are known in the art. Block polymers are known in which different monomers are polymerized by the same basic mechanism. Graft polymers are also described in many patents. However, it is not known from prior art that block polymers of the type described in this invention are possible.

The invention encompasses a broad range of polymers with wide application. The practice of this invention permits one skilled in the art to couple the properties of one polymer with that of another to obtain heretofore unknown combinations of properties. The significance of this becomes more apparent as one recites the combinations possible in this invention. The anionic portion of the block polymer may consist of polyethylene, polypropylene, crystalline or amorphous copolymers of ethylene and propylene, polybutene-1, olefinic copolymers of butene-1, polypentene-1, polyhexene-1, poly-4-methyl-1-pentene, and higher polyolefins and their copolymers; polystyrene, polybutadiene, polyisoprene, polypropylene oxide, polyethylene oxide, ethylene-propylene-cyclopentadiene terpolymers, and other polymers prepared with catalysts such as "Ziegler catalysts," organometallic compounds such as lithium alkyls, metal alkoxides, coordinated or uncoordinated, metals, etc. The only qualification is that a significant number of the chains remain attached to the catalyst and are active or "living" at the time of change-over from an anionic to free radical polymerization mechanism. The "free radical block" portion comprises about 0.1 to about 30 percent by weight, preferably about 1 percent to about 15 percent by weight, based on the weight of the block copolymer and may consist of any polymer of one or more monomers whose polymerization is initiated by a free radical source. These include either crystalline or amorphous polymers or copolymers from acrylonitrile, butadiene-styrene, butadiene-styrene-acrylonitrile, styrene, butadiene, isoprene, styrene-acrylonitrile, vinyl chloride, vinylidene chloride, vinyl acetate, vinyl-formal, vinylbutyral, methyl acrylate, methyl methacrylate, vinylpyridines, such as 4-vinyl pyridene and 2-vinyl pyridene, methylvinylpyridines, such as 2-methyl 5-vinyl pyridine, methylvinylpyridineacrylonitrile, acrylic acid or its salts, methacrylic acid or its salts, ethyl acrylate, ethyl methacrylate, butyl acrylate or methacrylate, dimethylaminoethyl acrylate, dimethylaminoethyl methacrylate, t-butyl aminoethyl methacrylate, methacrylamide, N - vinyl - 2-pyrrolidone and N-vinyl alkyl pyrrolidone, and 2-hydroxyethyl methacrylate, as well as other monomers in the family of olefins, diolefins, acrylics, vinylics, and allylics which are known to polymerize or copolymerize by a free radical mechanism.

One objective of the invention is to make polymers with the basic characteristics of polyolefins but with good receptiveness to dyes, inks, paints, and the like. Another objective is to improve the physical properties of the substrate by an appropriate block.

The following examples of specific AFR polymers will indicate the range of properties and utility of these polymers.

With polypropylene as substrate one can grow short blocks of poly (dimethylaminoethylmethacrylate) or its copolymers with other acrylic or methacrylic compounds to obtain a polymer suitable for fiber with essentially the physical properties of polypropylene and the dyeability of basic polymers. Alternately, one can make a polymer with large blocks of acrylics or methacrylic compounds which combine the physical properties and chemical inertness of polypropylene and the optical properties of acrylic polymers. Similarly, polyethylene can be modified for printability and paintability with short blocks of poly (dimethylaminoethylmethacrylate) or its copolymers. Long blocks provide polymers with properties of both polyethylene and polyacrylics.

Again using polypropylene as substrate for fiber, short blocks of poly (2-methyl-5-vinylpyridine) and its copolymers with acrylonitrile provide a dyeable fiber with the basic properties of polypropylene. Long segments of acrylonitrile-containing polymer impart the combined properties of polypropylene and polyacrylonitrile, suitable for high quality carpets. Polyethylene containing blocks of acrylonitrile-containing polymer acquire the higher surface hardness, higher melting, and resistance to hydrocarbon solvents typical of acrylonitrile polymers. Blocks of copolymers of acrylonitrile and styrene provide greater stiffness to the polymer.

Amorphous copolymers of ethylene and propylene can be modified with blocks of acrylonitrile-butadiene copolymers to render the ethylene-copolymer less oil soluble. Similarly, cis-1,4-polybutadiene, or 1,4-polyisoprene can be modified by acrylonitrile-butadiene, acrylonitrile-styrene, styrene, and other polymeric blocks to impart unique characteristics to rubbery materials.

Flame retardancy can be built into polyolefins by blocks of polyvinylidene chloride or its copolymers.

The brittleness of polystyrene can be modified by growing as blocks on polyethylene or by coupling with acrylic polymers or copolymers.

In addition to the novel combinations of properties possible by AFR polymers, they possess the unique ability to render dissimilar polymers compatible in one another. Hence, polypropylene and acrylic polymers which are normally not homogeneous become compatible by mixing with AFR polymers made from the two types of polymers. Moreover, it is not essential that all units of block 1 and block 2 have attached thereto units of the other block. In some cases where a chain transfer agent is used to limit molecular weight, an appreciable number of units made during the formation of block 1 will have been terminated before the monomer or monomers of block 2 are added. Similarly, units of block 2 may also be made which are unattached to block 1. Where economics dictate complete utilization of monomers during some phase of the polymerization, such mixtures are to be desired. Only a relatively small amount of true AFR polymers are required to couple the system effectively for many applications. Admixtures of polymers will occur primarily when high yields per unit amount of catalyst are desired.

Such block polymers may be prepared by first polymerizing the olefin or diolefin in the presence of an appropriate anionic catalyst to form the first block; then, without killing the active catalyst site, introducing to the reactor the monomer or monomers for the second block, adding a free radical generator such as a peroxide, and allowing the reaction to proceed until a sufficient amount of the second monomer or monomers has been added to the chain of block 1 to achieve desired properties.

The block polymerization process is further characterized in that any agitation during each polymerization stage is insufficient to cause any material decrease in molecular weight of either the first block or the final polymeric block product. Formation of the first block may be catalyzed by a variety of catalysts. For olefins anionic coordination complex catalysts are generally preferred. Many of such catalysts are known in the art. They generally involve an alkyl compound of metal from Groups I–III and a transition metal compound with or without a third complexing agent. The preferred heavy metal component of the catalyst system is titanium trichloride in combination with an aluminum trialkyl or aluminum alkyl halide. When the aluminum compound is a trialkyl or dialkyl halide, no further catalyst component is necessary. However, when the aluminum compound is an aluminum alkyl dihalide or sesquihalide, it is necessary to add a further complexing compound capable of donating electrons to the aluminum alkyl dihalide in order to have an effective catalyst. Suitable complexing compounds include amines, ethers, nitriles, and other compounds functioning as Lewis bases. Particularly useful complexing agents include ethyl orthosilicate, triethylene diamine, and methyl tetrahydrofuran. Olefin or diolefin pressure is not critical and may range from atmospheric to many atmospheres. For propylene a preferred pressure for commercial operations is 125 to 150 p.s.i.g. Temperature may vary from ambient to 200° C. However, for propylene it should preferably be from about 120° F. to 165° F., although temperatures outside this range may be used. The polymerization time will vary inversely with the olefin or diolefin pressure and is generally from about 1 hour to about 30 hours, preferably about 2 hours for ethylene or propylene and 10 to 24 hours for diolefins.

With diolefins the catalyst may be anionic coordinated complex catalyst, such as aluminum alkyl-TiI$_4$ for butadiene polymerization, or a relatively simple catalyst such as lithium alkyl for polyisoprene.

It is essential that the polymer of block 1, to be able to grow another chain thereto, be a "living" polymer attached to the anionic catalyst site when the monomer or monomers of block 2 are added. If the reaction mixture is killed as with methanol at the end of the polymerization so that chains become detached completely from the catalyst, as is customary at the end of anionic reactions, and the other monomers are then added, no block 2 is incorporated into the final polymer recovered from the reaction. It is believed that this fact is proof that the copolymers of this invention are block polymers consisting of a single section of free radical polymer since, if a graft polymerization were taking place, with the added monomers entering the polymer chain in a random fashion along the backbone of the molecule, it would not matter whether or not the polymer of block 1 were still attached to the anionic catalyst.

Under some conditions, an agent such as water may be added to the system to deactivate excess alkyl which is competing with free radical monomers and therefore decreases yield unless deactivated. In these cases it is believed that the chains of block 1 remain attached to the catalyst and available for addition of monomer or monomers of block 2.

In the polymerization step of block 2 the temperature may range from below room temperature (0° F.) to about 180° F. or higher. The free radical source may include peroxides, hydroperoxides, peroxyacids, peroxyesters, azonitriles, azo- and diazo-compounds, triazines, azides, radiation of various kinds including gamma ray, ultraviolet and other rays of high energy, glow discharge or corona discharge, or other chemical or physical means of generating free radicals. The free radical generators preferred in this step include benzoyl peroxide, lauroyl peroxide, acetyl peroxide, 2,4-dichlorobenzoyl peroxide, methyl ethyl ketone peroxide, t-butyl hydroperoxide, and bisazoisobutyronitrile, although the invention is not limited to the use of these particular compounds. In general, the free radical generator, if a chemical agent, should be added in an amount of from about 0.01 to 2.0 percent by weight, based on the weight of the reaction mixture. The time of the block polymerization will vary with the concentration of the monomers in the reaction medium and the ratio of the monomers to the performed polymer of block 1, but generally the reaction mixture should be stirred for a period of time sufficient to incorporate about 1 to 30 weight percent of a polar block into the polymer, usually from about 4 to about 20 hours, although longer or shorter times may be used.

The linear block copolymers obtained by practicing this invention wherein the anionically polymerized block is obtained from an alpha-olefin may be characterized as normally solid, high molecular weight and substantially crystalline. By the term "substantially crystalline," it is meant that the block copolymer contains at least 25%, and preferably at least 50%, crystallinity as determined by density-crystallinity relationships, a type of technique described by J. A. Gailey et al., SPE Technical Papers (ANTEC), Vol. IX, Session IV–1, pages 1 to 4, February 1963. Because of the broad scope of the present invention, it is necessary to select certain groups of AFR polymers encompassed by the invention to illustrate but not limit the invention.

SECTION I

Block copolymers of olefins and acrylic esters

The section relates primarily to copolymers of polypropylene and acrylic esters, particularly to readily dyeable copolymers of propylene, and more particularly to block copolymers of propylene and dimethylaminoethylmethacrylate and block copolymers of propylene and copolymers of dimethylaminoethylacrylate and ethylacrylate or methylmethacrylate.

Crystalline polypropylene may be spun into fibers of great strength, but the fibers are very hydrophobic and cannot be readily dyed. Several approaches for improving the dyeability of polypropylene fibers have been made in the past. One approach has been to mix with the polypropylene, prior to spinning it into fibers, a polymer of a polar monomer which is dye-receptive, such as, for example, the polymers shown in French Pat. No. 1,274,733. While fibers spun from such physical mixtures are dyeable to a certain extent, they are usually not fast to dry cleaning, since the dry-cleaning solvents tend to dissolve the polar polymer. In addition, there is always a problem of incompatibility, and inhomogenous blending may result in weak points in the fiber.

Another approach has been to graft polar monomers onto the polypropylene backbone in order to chemically bind dye sites thereto. Grafting may be accomplished by peroxidation of the polymer followed by contacting with the monomer to be graft polymerized, as shown in Canadian Pat. No. 632,541; by irradiation of the polymer in the presence of the monomer to be grafted, as discussed by Geleji et al., Journal of Polymer Science (C), No. 4, pp. 1223–1232; or by subjecting the polymer to shearing forces in the presence of the monomer to be grafted and a peroxide as shown in U.S. Pat. No. 3,177,269 to Nowak et al. While such treatments render the polypropylene dye-receptive, the polymer is necessarily degraded in part by the treatment, and its physical properties are not as good as those of the untreated polymer. Also, the side chains introduced onto the polypropylene backbone tend to interfere with crystallization.

A still further approach has been to incorporate small quantities of polyvalent metal compounds into the polymer and then to dye it with dyestuff capable of chelating with the polyvalent metal. Illustrative of this approach is U.S. Pat. No. 3,164,438. While this approach has the advantage of retaining the tensile strength and other desirable physical properties of unmodified polypropylene, special dyes must be used, and the colors obtained thereby are dull.

This species of this invention provides a polymeric material based on propylene which may be spun into filaments having the tensile strength, crystallinity, and resistance to solvents of polypropylene and which may be readily dyed to bright colors with conventional acid dyes.

We have now discovered that this object may be attained by incorporating into the polypropylene molecule, as a block polymer and not as a graft polymer, small amounts of dimethylaminoethylmethacrylate (DMAEMA)

or mixtures thereof with ethylacrylate (EA) or methylmethacrylate (MMA). Other acrylics useful in the reaction include methylacrylate (MA), t-butyl aminoethylmethacrylate (BAE), and hydroxyethylmethacrylate (HEMA). Since the acrylates are introduced as an end block rather than as a graft, the crystallinity and other good physical properties of the polypropylene segment are retained in the final polymer.

In general, in accordance with this species, propylene is polymerized in the presence of an anionic coordinated complex catalyst, such as aluminum diethyl monochloride and a titanium trichloride at a pressure of 40 to 150 p.s.i.g. and a temperature in the range of 120° F. to 170° F. for a period of 2 to 4 hours. The polymerization flask is then cooled to room temperature, and most of the propylene is vented off. The acrylic monomer, or mixtures thereof are then added, followed by the peroxide. The temperature is raised to about 165° F. and the reaction mixture is permitted to polymerize from 4 to 20 hours. The polymer is then recovered and analyzed for composition and dyeability. It is essential that the acrylic monomer be added to the reaction mixture prior to the addition of peroxide, since if the peroxide is added first, no block copolymers are formed.

While a substantial level of dyeability is reached by following the foregoing procedure, even better results are obtained in some instances if the free radical part of the polymerization takes place in the presence of a small amount of water or dilute aqueous alkali or acid solution, where the acrylic monomer, such as DMAEMA is present during the free radical polymerization. However, in other instances, it appears that presence of water is detrimental.

In order that those skilled in the art may more fully understand the nature of our invention and the method of carrying it out, the following controls and examples are given.

Control 1

One hundred ml. of dry hexane were placed in a 250 ml. pressure bottle, and 1 mmol each of violet titanium trichloride and diethyl aluminum chloride were added under nitrogen. The bottle was then capped and placed in a 70° C. bath. Propylene was then introduced via a tube passing through the cap to a pressure of 40 p.s.i.g., and the bottle was maintained at this temperature and pressure for a period of 3 hours while stirring with a magnetic stirrer. At the end of this time, the bottle was opened and the catalyst was deactivated by adding a mixture of 10 ml. of isopropanol and 20 ml. of methanol. The resultant white suspension of polypropylene was filtered, washed, and dried. About 15 to 20 grams of crystalline polypropylene were recovered.

The polypropylene, after drying under diminished pressure and $N_2$ flushed, was then resuspended in 100 ml. of hexane at room temperature, and 0.40 ml. of water and 2.0 ml. of DMAEMA were added. Then 0.1 gram (0.4 mml.) of benzoyl peroxide was added, and the mixture was stirred at 70° C. for 15 hours, after which the solid polymer was recovered by filtration and was washed with hexane, methanol, anhydrous methanol, methanol-dilute NaOH, methanol water, and methanol by chopping in a Waring blender, the latter to remove any DMA homopolymers which might have been formed.

Th solid polymer was then suspended in 200 cc. of a solution of Wool Fast Blue GL dye, 0.4 cc. of dichlorobenzene was added as a carrier, and the suspension was stirred at 90° C. for 1 hour. It was then removed from the dye bath and scoured with a 1 percent solution of Triton X–100 at 70° C. for 1 hour, after which it was visually judged for dyeability according to a scale where O indicates no dye pick-up, 1 indicates a pale shade, 2 is a light shade, 3 a medium shade, and 4 a dark shade. The polymer rated O, indicating no dye pick-up.

EXAMPLE I

Polymerization of propylene was carried out as described in Control 1, except that at the end of a 3-hour reaction period the bottle was depressured and opened under a nitrogen atmosphere. While holding the bottle at room temperature, 2.0 ml. of DMAEMA were added, followed by 0.2 gram of benzoyl peroxide. The mixture was then stirred at 70° C. for 16 hours, after which it was washed, first with methanol, then with alcoholic HCl, then with alcoholic NaOH, and finally with more methanol. An aliquot of the white powder recovered was formed into a film for I.R. examination, and another aliquot was dyed as described in Control 1. The dyeability rating was 3, indicating a fair to good dyeability. The polymer contained 1.2 percent DMAEMA, calculated by measuring by infrared the carbonyl absorbance peak of the polymer, and comparing it with the peak height of polymethylmethacrylate, used as a standard.

EXAMPLE II

The general procedure of Example I was followed, except that after the propylene polymerization, 0.4 ml. of water was added to the polymerization, followed by 2.0 ml. of DMAEMA and 0.1 gram of benzoyl peroxide. The resultant block copolymer contained 2.0 percent DMAEMA and had a dyeability rating of 4.

EXAMPLE III

Example II was repeated, except that the amount of water was increased to 5.0 ml. The resultant copolymer contained 3.1 percent DMAEMA and had a dyeability rating of 4.

EXAMPLE IV

Example II was repeated, substituting 0.4 ml. of 5 percent aqueous NaOH solution for the water. The resultant copolymer contained 3.2 percent DMAEMA and had a dyeability rating of 4.

EXAMPLE V

Example II was repeated, substituting 0.4 ml. of 5 percent aqueous HCl for the water. The resultant copolymer contained 2.2 percent DMAEMA and had a dyeability rating of 4+.

EXAMPLE VI

Example II was repeated, except that a mixture of 1 ml. of EA and 1 ml. of DMAEMA were added in that order in place of the 2 ml. of DMAEMA. The resultant copolymer had incorporated into it 4 percent of polar monomers and had a dyeability rating of 4+.

EXAMPLE VII

Example II was repeated, maintaining the temperature at 50° C. during the free radical polymerization, and adding 1 ml. of DMAEMA and 1 ml. of MMA, in that order, instead of the 2 ml. of DMAEMA. The resultant copolymer contained 1.4 percent of polar monomers and had a dyeability rating of 3+.

EXAMPLE VIII

Example VII was repeated twice, except that the temperature during the free radical polymerization was 70° C. and 80 to 85° C., respectively. The copolymers recovered from these runs contained 2.7 percent and 2.8 percent of polar monomer, respectively, and had dyeability ratings of 4+.

EXAMPLE IX

Example II was repeated, except that 1 ml. of MMA and 1 ml. of DMAEMA were used in place of 2 ml. of DMAEMA, and that 0.2 gram of benzoyl peroxide were used instead of 0.1 gram. The resultant polymer contained 4.3 percent of polar monomers and had a dyeability rating of 4−.

EXAMPLE X

Example IX was repeated, except that in the propylene polymerization the catalyst level was 0.6 mmol. of diethyl aluminum chloride and 0.5 mmol of TiCl$_3$ instead of the 1 mmol of each used in Example IX. The resultant copolymer contained 4.0 percent polar monomers and had a dyeability rating of 4+.

EXAMPLE XI

Example X was repeated, substituting methyl acrylate for MMA. The resultant polymer contained 3 percent polar monomers and had a dyeability rating of 4+.

In order to demonstrate that the polymers of the invention are true block copolymers and not mixtures of propylene homopolymer and homopolymers or copolymers of the acrylic monomers, samples were subjected to extractions designed to remove any acrylic homopolymers or copolymers which might have been formed in the reaction. A first sample of propylene, DMAEMA, and MMA copolymer was extracted for 4.5 hours with boiling methyl ethyl ketone and then for 6 hours with boiling benzene, and was formed into a film for infrared analysis. The unextracted sample gave a

absorbance per mil of 0.186, and after extraction its

absorbance was 0.165. Both extracted and unextracted polymers had dyeability rating of 4+. A second sample of propylene, DMAEMA, and MMA copolymer was extracted for 3 hours with boiling dimethyl formamide, then for 6.5 hours with boiling methyl ethyl ketone, and then for 6.5 hours with boiling benzene. This sample before extraction had a

absorbance of 2.11 and after extraction an absorbance of 2.10. Both the extracted and unextracted polymer had a dyeability rating of 4+.

EXAMPLE XII

Into a 250 ml. pressure bottle, hexane (100 ml.) and 1 mmol of each TiCl$_3$ (AA) and Et$_2$AlCl were added. The bottle was capped and placed in a 70° C. bath. Ethylene was then introduced via a tube passing through the cap to a pressure of 20 p.s.i.g., and the bottle was maintained at this temperature and pressure for a period of 2 hours, while stirring with a magnetic stirrer. Ethylene pressure was released, and the reaction mixture was cooled to about room temperature, H$_2$O (0.4 ml.) was added, and the mixture was stirred at room temperature for 15 minutes, DMAEMA (2.0 ml.) was then added, followed by benzoyl peroxide (0.1 gram). The mixture was stirred at 70° C. for 16 hours. The polymer was treated in the same manner as described in Control 1. The polymer (yield 6.7 grams) contained 5 percent of DMAEMA as shown by I.R. analysis. The dyeability rating of the polymer was 4+.

EXAMPLE XIII

Example XII was repeated, except that 1 ml. of EA and 1 ml. of DMAEMA were used instead of 2.0 ml. of DMAEMA. After finishing, the polymer obtained weighed 6.4 grams and contained 5.9 percent of DMAEMA. The dyeability rating of the polymer was 4+.

EXAMPLE XIV

The procedure given in Example XII was followed with a few modifications. Ethylene was charged into the pressure bottle to 10 p.s.i.g. for 0.5 hour. Propylene was then introduced into the bottle to a pressure of 40 p.s.i.g., and the bottle was maintained at this temperature and pressure for a period of 2 hours. The source of propylene was then turned off and the mixture was stirred at 70° C. for 30 minutes to use up most of the rest of the propylene in the bottle. At the end of the half hour, ethylene again was introduced into the bottle to 20 p.s.i.g. for 30 minutes. The reaction mixture was then cooled to room temperature. H$_2$O (0.4 ml.) was added and the mixture was stirred at room temperature for 15 minutes. DMAEMA (1.0 ml.) and benzoyl peroxide (0.1 gram) were then followed. The mixture was stirred at 70° C. for 16 hours. The finished polymer (14.7 grams) contained 4.1 percent of DMAEMA as shown by I.R. scan. The dyeability rating of the polymer was 4.

EXAMPLE XV

Example XIV was repeated except that 1.0 ml. of dimethylaminoethylacrylate (DMAEA) was used instead of DMAEMA. The resultant polymer weighed 10.3 grams and had 3.2 percent of DMAEA. The dyeability rating of the polymer was 4.

EXAMPLE XVI

Example I was repeated except that 2.0 ml. of ethyl acrylate (EA), instead of DMAEMA, and 0.1 gram of benzoyl peroxide were used. The resultant block copolymer contained 0.22 percent of EA.

EXAMPLE XVII

Example XVI was repeated except that 2.0 ml. of MMA was used in place of 2.0 ml. of EA, and 0.2 gram of benzoyl peroxide was used instead of 0.1 gram. The polymer thus obtained weighed 17.5 grams and contained 0.5 percent of MMA.

EXAMPLE XVIII

Example XVI was repeated except that 2.0 ml. of MA was used instead of 2.0 ml. of EA. The finished block polymer weighed 13.6 grams and contained 0.13 percent of MA.

EXAMPLE XIX

Example XVI was repeated except that 2.0 ml. of BAE was used instead of 2.0 ml. of EA. The resultant block polymer weighed 14.9 grams and contained 0.7 percent BAE. The dyeability rating of the polymer was 2.

EXAMPLE XX

Example XVI was repeated except that 2.0 ml. of dimethylaminoethyl acrylate (DMAEA) was used and that the reaction mixture after the addition of benzoyl peroxide was stirred at room temperature for 16 hours. The resultant polymer weighed 23.1 grams and contained 0.3 percent of DMAEA. The polymer had a dyeability rating of 1.

EXAMPLE XXI

Example II was repeated except that 1 ml. of DMAEA was used instead of 2.0 ml. of DMAEMA and the polymerization mixture was stirred at 50° C. for 16 hours after the additions. The resultant polymer weighed 11.6 grams and contained 2.1 percent of DMAEA. The dyeability rating of the polymer was 4—.

EXAMPLE XXII

Example XVI was repeated except that 3.0 ml. of a 30 percent aqueous solution of HEMA and 2.0 ml. of DMAEMA were used instead of 2.0 ml. of EA. The resultant polymer weighed 15.6 grams and contained 12.3 percent (calculated as DMAEMA) of a mixture of DMAEMA and HEMA. The polymer had a dyeability rating of 4. The I.R. scan of the polymer also showed the presence of —OH groups.

Following the same procedures given in the foregoing examples, block polymers of polypropylene and polymers or copolymers from butyl acrylate, butyl methacrylate, n-hexyl methacrylate, stearyl methacrylate, and lauroyl methacrylate, etc., can be made by substituting the 2.0 ml. of EA used in Example XVI with 2.0 ml. of any of the above-named acrylates or 1.0 ml. of each of the 2 (or more) of the above-named acrylates.

EXAMPLE XXIII

A one-gallon Pfaudler glass-lined, agitated autoclave is charged with a portion of hexane and heated to 71° C. by circulating hot water through the reactor jacket. Excess $N_2$ is vented (used in pressurizing solvent) to 8 p.s.i.g. pressure. Hydrogen equal to 22 p.p.m. (based on hexane weight) is introduced into the autoclave from a calibrated stainless steel container. The autoclave is then pressured with 75 p.s.i.g. propylene. A stainless steel container prepared in the dry box and containing the catalyst components, is connected to the autoclave and its contents washed down with hexane so that a total of 2500 ml. hexane were present in the reactor. The catalyst was made by aging first a mixture of 72.5 ml. of 5.65 weight percent $EtAlCl_2$, 9 ml. hexane and 7.25 ml. of 20 percent (vol.) $(EtO)_4Si$ at 50° C. for three quarters of an hour. 10.4 ml. of a mixture of 0.10 gram $TiCl_3$ in 100 ml. of Nujol was added to the aged $EtAlCl_2$ mixture and the final mixture was aged again at 50° C. for three quarters of an hour. Polymerization was carried out for 1.7 hours at 71° C. under 75 p.s.i.g. propylene pressure. During this time, 545 ml. of $C_3^=$ was polymerized. At the end of the reaction, the unreacted propylene and hydrogen were vented slowly, and the reaction mixture was cooled to room temperature. A mixture of 3 ml. of 5 percent NaOH in 100 ml. hexane was added. After stirring for 20 minutes, EA (30 ml.), and DMAEMA (30 ml.), were added, followed by benzoyl peroxide (3.0 grams). There was a 15-minute stirring between each addition. The mixture was heated to 70° C. for 4.5 hours. The catalyst was destroyed by adding MeOH to the mixture. The polymer was filtered, and chopped in a one-gallon Waring Blender with hexane and filtered. The filtered product was then chopped twice with MeOH and filtered after each chopping. The solid product was then washed with pentane, filtered and dried. The polymer thus obtained contained 1.6 percent DMA (by $N_2$ analysis) or 2 percent DMAEMA and EA (by I.R. analysis). The polymer had a dyeability rating of 4—.

EXAMPLE XXIV

The general procedure for the propylene polymerization given in Control 1 was followed. After the propylene polymerization, the mixture was cooled in an ice-bath to about 20° C. While the bottle was still in the ice-bath, $H_2O$ (0.4 ml.) was added to the mixture, followed by 1.0 ml. of DMAEMA, 1.0 ml. of MMA, and 0.4 mmol of lauroyl peroxide. After the addition, the mixture was stirred for 15 minutes at room temperature and was then placed at 70° C. for 3 hours. The polymer thus obtained was treated in the same manner as described in Control 1. The polymer weighed 16.1 grams and contained 4.4 percent of DMAEMA and MMA. The dyeability rating was 4+.

EXAMPLE XXV

Example XXIV was repeated except that 0.4 mmol of acetyl peroxide was used instead of lauroyl peroxide. The polymer weighed 14.3 grams and contained 3.1 percent of DMAEMA and MMA. The dyeability rating was 4+.

EXAMPLE XXVI

Example XXIV was repeated, except that 0.4 mmol of t-butyl hydroperoxide was used in place of lauroyl peroxide. The finished block polymer weighed 19.8 grams and contained 2 percent of DMAEMA and MMA. The dyeability rating of the polymer was 4.

EXAMPLE XXVII

Example XXIV was repeated, except that 0.4 mmol 2,4-dichlorobenzoyl peroxide was used instead of lauroyl peroxide. The resultant block polymer weighed 18.5 grams and contained about 2.9 percent of DMAEMA and MMA. The dyeability rating was 4.

EXAMPLE XXVIII

Example XXIV was repeated, except that 0.4 mmol of methyl ethyl ketone peroxide was used in place of lauroyl peroxide. The resultant polymer weighed 21.4 grams and contained about 3.3 percent of DMAEMA and MMA. The dyeability rating of the polymer was 3+.

EXAMPLE XXIX

Example XXIV was repeated, except that 0.4 mmol of benzoyl peroxide was used in place of lauroyl peroxide. The polymer thus obtained weighed 17.4 grams and contained about 3.8 percent of DMAEMA and MMA. The dyeability rating was 4+.

SECTION II

Block copolymers of olefins and unsaturated amino compounds other than acrylic esters This species of the invention also provides block copolymers which may be spun into fibers having the strength and other desirable characteristics of unmodified polyolefin fibers, and which are readily dyeable with acid dyes. Particularly useful amino compounds are 2-methyl-5-vinyl pyridine (MVP) and acrylonitrile (ACN). In general, the reaction is carried out in the same manner as in the preparation of block copolymers of olefins and acrylic monomers, as described above.

In the case where it is desired to add a block of a copolymer of MVP and ACN to the polyolefin block, it is preferable to first add the MVP to the reaction mixture, followed by ACN. If the ACN is added first, followed by the vinyl pyridine, the MVP will enter into the polymer molecule, whereas the ACN will, or will not, depending upon the amount of benzoyl peroxide used and the free radical temperature used, and the resulting copolymer of propylene and vinyl pyridine may dye to a lighter shade than those copolymers made by adding vinyl pyridine first to the mixture. It is also essential that the polypropylene be a living polymer attached to the aluminum alkyl-metal halide catalyst when the acrylonitrile and vinyl pyridine are added. If the reaction mixture is killed with methanol at the end of the propylene polymerization reaction, as is customary in such reactions, and the other monomers and peroxide are then added, little or no ACN or MVP is incorporated into the polypropylene molecule. It is believed that this fact is proof that the copolymers of this invention are block copolymers consisting of a section of crystalline polypropylene linked to a second section consisting of a polymer of acrylonitrile and vinyl pyridine, since, if a graft polymerization were taking place, with the added monomers entering the polypropylene molecule in a random fashion along the backbone of the molecule, it would not matter whether or not the propylene polymer was still attached to the catalyst.

In order that those skilled in the art may more fully understand the nature of this species of our invention and the method of carrying it out, the following controls and examples are given.

Control 2

One hundred ml. of dry hexane were placed in a 250 ml. pressure bottle, and 1 mmol each of violet titanium trichloride and diethyl aluminum chloride were added under nitrogen. The bottle was then capped and placed in a 50° C. bath. Propylene was then introduced via a tube passing through the cap to a pressure of 40 p.s.i.g., and the bottle was maintained at this temperature and pressure for a period of 2 hours while stirring with a magnetic stirrer. At the end of this time, the bottle was opened and the catalyst was deactivated by adding a mixture of 10 ml. of isopropanol and 20 ml. of methanol. The resultant white suspension of polypropylene was filtered, washed, and dried. About 7 grams of crystalline polypropylene were recovered.

The polypropylene (dried and $N_2$ flushed) was then resuspended in 100 ml. of hexane at 30° C. under $N_2$, and 2.0 ml. of MVP were added, followed, 10 minutes later, by 2.0 ml. of ACN. Then 0.1 gram of benzoyl peroxide was added, and the mixture was stirred at 30° C. for 20 hours, after which the solid polymer was recovered by filtration and was washed in a Waring blender with hexane, methanol, MeOH-dilute HCl, MeOH-dilute NaOH, MeOH—$H_2O$, and MeOH to remove any homopolymers or copolymers of MVP and ACN which might have been formed.

The solid polymer was then suspended in 200 cc. of a solution of Wool Fast Blue GL dye, and 0.4 cc. of dichlorobenzene was added as a carrier at 90° C. for 1 hour. It was then removed from the dye bath and scoured with a 1 percent solution of Triton X–100 at 70° C. for 1 hour, after which it was visually judged for dyeability according to the procedure outlined in Control 1. The polymer rated O, indicated no dye pick-up.

EXAMPLE XXX

Propylene polymerization was carried out as described in Control 1, except that pentane was used as the reaction medium instead of hexane, but the catalyst was not deactivated. Under nitrogen, the bottle was opened and 2.0 ml. of ACN were added. The color of the suspension changed from violet to brown. After stirring for 10 minutes, 2.0 ml. of MVP were added, followed by 0.1 gram of benzoyl peroxide. The mixture was then stirred for 20 hours at 30° C. From time to time a small sample of supernatant liquor was withdrawn and tested by gas chromatography for the disappearance of ACN. At the end of 20 hours essentially no ACN had disappeared, and the reaction was terminated as described in Control 1. A solid polymer was recovered from the reaction mixture which weighed 7.6 grams and appeared to contain, by I.R. analysis, about 0.67 percent of MVP. This polymer was dyed as described above and achieved a rating of 2—.

EXAMPLE XXXI

Example XXX was repeated except that the MVP was added first, followed by ACN. No change of color was noted. In following the course of the reaction by gas chromatography, a gradual disappearance of ACN was noted, until at the end of the 20-hour reaction period 50 percent of the ACN had disappeared. The polymer recovered from this run weighed 8.5 grams and appeared by I.R. analysis to contain about 3.2 percent ACN and 3.9 percent MVP. When dyed as described above, this polymer had a rating of 4.

EXAMPLE XXXII

Example XXXI was repeated, except that the ACN was increased to 3 ml. At the end of a 20-hour reaction time, 63 percent of the ACN had disappeared. The polymer recovered from this run weighed 8.5 grams and appeared by I.R. analysis to contain about 6.0 percent ACN and 5.3 percent MVP. The polymer had a dyeability rating of 4.

EXAMPLE XXXIII

Example XXX was repeated, except that 3.0 ml. of ACN was used instead of 2.0 ml. of ACN and that 0.2 gram benzoyl peroxide was used in place of 0.1 gram benzoyl peroxide. At the end of 20 hours, 50.0 percent of the ACN had disappeared. A solid polymer was recovered from the reaction mixture which weighed 10.6 grams. I.R. scan of the polymer showed that it contained 4.4 percent MVP and 2.7 percent ACN. This polymer had a dyeability of 4.

EXAMPLE XXXIV

Example XXXII was repeated except that 0.2 gram peroxide was used. At the end of 20 hours, 79 percent of the ACN had disappeared. The polymer obtained weighed 11.1 grams and contained 4.9 percent and 5 percent ACN. The polymer had a dyeability rating of 4+.

EXAMPLE XXXV

Example XXXI was repeated except that 1 mmol of each of violet $TiCl_3$ and $Et_2AlCl$ were added to the polypropylene (20 grams) suspension, and the mixture was stirred at room temperature for an hour before the addition of MVP (2.0 ml.), ACN (3.0 ml.), and benzoyl peroxide (0.1 gram). The polymer finally obtained contained 0.44 percent MVP and 0.3 percent ACN. This polymer was then extracted with dimethylformamide for 16 hours and methyl ethyl ketone for 5 hours. The I.R. scan of the polymer after the extraction showed that the polymer contained 0.36 percent of MVP and trace (or none) of ACN. The dyeability rating of the polymer before extraction was 2 and was 1+ after extraction.

EXAMPLE XXXVI

Propylene polymerization was carried out as described in Control 2, except that the polymerization was run for 3 hours at 70° C., and the catalyst was not deactivated. The polymerization mixture was cooled to room temperature and 2.0 ml. of MVP was added. After stirring for 10 minutes, 3.0 ml. of ACN were added, followed by 0.1 gram of benzoyl peroxide. The mixture was stirred at room temperature for 20 hours. The polymer (24.5 grams) was then treated in the same manner as described in Control 1. The polymer contained 2.03 percent of MVP and 2.5 percent of ACN as shown by I.R. analysis. It had a dyeability rating of 4+. The polymer then extracted with DMF and MEK as described in Example XXXV. The polymer, after extraction, contained 2.24 percent of MVP and 3.3 percent of ACN and had a dyeability rating of 4.

EXAMPLE XXXVII

The general procedure for propylene polymerization given in Example XXXVI of this section was followed.

After the propylene polymerization, the mixture was cooled in an ice-bath for 20 minutes. ACN (3.0 ml.) was then added, followed by 0.15 gram of benzoyl peroxide. The mixture was stirred in the ice-bath for about 3 hours and was then left at room temperature with stirring overnight. The polymer was then treated in the same manner as described in Control 2 of this section. The polymer contained 8.4 percent of poly-ACN, and established that at low temperatures ACN by itself can be incorporated into the polymer as a block. If the example is repeated using methacrylonitrile instead of ACN, essentially the same result, incorporation of a substantial amount of methacrylonitrile into the polymer as a block, is obtained.

EXAMPLE XXXVIII

The general procedure for propylene polymerization given in Example XXXVI of this section was followed. After the propylene polymerization, the mixture was cooled to room temperature and 0.5 ml. of MVP was added. After the addition, the mixture was stirred 20 minutes at room temperature, and 4.0 ml. of styrene and 2.0 ml. of ACN were added in the named order, followed by 0.2 gram of benzoyl peroxide. The mixture was stirred at room temperature for 16 hours. The catalyst was killed and the polymer was treated in the same manner as described in Control 1. The AFR polymer (27.4 grams) obtained was a block copolymer, the first block being a homopolymer of propylene, and the second a copolymer of MVP, styrene, and ACN. The polymer contained 1.78 percent of MVP and 5.3 percent of ACN. These percentages of MVP and ACN represent a 100 percent utilization of MVP added and 90 percent of total ACN used. The amount of styrene was not determined. The addition of the styrene definitely increased the incorporation of the MVP and ACN. The dyeability of the polymer was 4.

EXAMPLE XXXIX

The general procedure given in Example XXXVIII was followed except that 4.0 ml. ACN and 2.0 ml. of styrene were added in the named order to the mixture. The final polymer obtained was a block copolymer of polypropylene, and a copolymer of MVP, styrene, and ACN. It contained 1.58 percent of MVP and 7.0 percent of ACN. These percentages represent a 90 percent utilization of MVP monomer and 60 percent of utilization of ACN monomer added. The dyeability of the polymer was 3.

SECTION III

Miscellaneous AFR block copolymers

The reactions set forth in the previous sections produced products which could be spun into readily dyeable fibers while retaining the tensile strength of the olefin polymer block. The AFR polymerization may also be used to modify the properties of hydrocarbon polymers produced by an anionic polymerization in other respects, as illustrated in the following examples.

EXAMPLE XL

Propylene was first polymerized in accordance with the procedure set forth in Example I. The reaction mixture was then cooled to room temperature. 2.0 ml. of vinylidene chloride was then added, followed by 0.1 gram of benzoyl peroxide. The mxture was then stirred at 70° C. for 16 hours. After cleanup as described in Example I, the polymer was pressed into a film and examined by infrared analysis. The infrared scan showed the presence of chlorine in the block polymer. The molecular weight of this block copolymer will exceed 10,000 as determined from the inherent viscosity in tetralin at 145° C. using the Staudinger equation and the density of the block copolymer will exceed at least 0.85 (ASTM D1505–57T). Also, the block copolymer contains at least 80% by weight of polymerized propylene.

EXAMPLE XLI

Example XL is repeated, substituting vinyl chloride for vinylidene chloride, and the mixture is stirred for 16 hours at 10 to 25° C. after the addition of benzoyl peroxide. After cleanup, infrared analysis shows the presence of chlorine, indicating incorporation of a block of polyvinyl chloride into the polymer.

EXAMPLE XLII

Example XL is repeated, substituting 3.0 grams (in benzene solution) of vinyl stearate for the vinylidene chloride. Infrared analysis of the product shows the presence of carbonyl groups, indicating the incorporation of a block of polyvinylstearate into the polymer.

EXAMPLE XLIII

Example XL is repeated, substituting 2.0 ml. of vinyl acetate for the vinylidene chloride. Infrared analysis of the solid polymer obtained shows the presence of carbonyl groups, proving that the product is a block copolymer of propylene and vinyl acetate.

The products of Example XL through XLIII, when molded into shaped articles, have better clarity than unmodified polypropylene, and have better low temperature stress resistance. In addition, the product of Example XLIII is dye receptive.

EXAMPLE XLIV

One hundred ml. of hexane, together with 1.88 mmol of ethyl aluminum dichloride and 0.48 mmol of ethyl silicate were placed in a pressure bottle in an atmosphere of nitrogen, and the mixture was aged for 10 minutes at room temperature. $VOCl_3$ (0.47 mmol) was then added, and the bottle was placed in a 70° C. bath. The bottle was pressured with propylene to 37 p.s.i.g. With propylene source turned off, the pressure in the bottle was increased to 45 p.s.i.g. with a mixture of 60 mol percent of ethylene and 40 mol percent of propylene. The bottle was maintained at this pressure, while continuously introducing the mixture of ethylene and propylene and stirring the contents, for 3 hours. At the end of this time, the bottle was cooled to room temperature, 0.4 ml. of water was added, and the mixture was stirred for 15 minutes. 1.0 ml. of DMAEMA was then added, followed by 0.15 gram of benzoyl peroxide. The mixture was then brought back to 70° C. and was stirred for 16 hours. Then sufficient methanol was added to precipitate the polymer, which was recovered and washed 3 times with methanol in a Waring blender. A block polymer, 1 block being a random copolymer of ethylene and propylene, the other poly-DMAEMA was obtained. The product had 2.6 pervent DMAEMA. The product has greater shear stability than unmodified ethylene-propylene copolymer, and has utility as a V.I. improver in lubricating oils.

EXAMPLE XLV

Ethylene and propylene were copolymerized as described in Example XLIV. At the end of the reaction the mixture was cooled to room temperature and 2.0 ml. of MVP was added. After stirring for 10 minutes, 2.0 ml. of ACN was added, followed by 0.2 gram of benzoyl peroxide. The mixture was then stirred at room temperature for 16 hours. At the end of this time, methanol was added to the mixture to precipitate the polymer. The polymer was recovered and washed thoroughly with methanol, isopropanol, and methanol in a Waring Blender. The polymer thus made contained 2.8 percent ACN and also showed the presence of MVP by infrared analysis. The block copolymer made in this fashion may be cured with peroxide in the manner conventionally used with ethylene-propylene rubber, and is more resistant to oils than unmodified ethylene-propylene rubber.

EXAMPLE XLVI

One hundred ml. of hexane, 1 mmol of triisobutyl aluminum, 0.83 mmol of TiCl₄ and 10 ml. of isoprene were mixed under nitrogen in a 250 ml. pressure bottle, and the mixture was stirred at room temperature for 4 hours in order to polymerize the isoprene. Then 2.0 ml. of MVP were added. After stirring 10 minutes at room temperature, 2.0 ml. of ACN were added, followed by 0.2 gram of benzoyl peroxide. The mixture was stirred at 25° C. for 16 hours and was treated with methanol to precipitate the polymer. The polymer was then washed 3 times with methanol in a Waring Blender and dried. The polymer obtained was much tougher or stiffer than cis-polyisoprene made with the same catalyst, to which benzoyl peroxide but no MVP or ACN was added. The polymers so produced may be vulcanized in the same manner as polyisoprene but exhibit greater stiffness and oil resistance than unmodified vulcanized polyisoprene.

EXAMPLE XLVII

The same procedure given in Example XLVI was followed except that the isoprene was only polymerized for 2 hours at room temperature and that 4.0 ml. of each of styrene and ACN were used. The styrene was added first to the isoprene mixture. The polymer obtained weighed 5.1 grams and contained both ACN and styrene.

EXAMPLE XLVIII

The same procedure given in Example XLVI was followed, except that 2.0 mmol of TiCl₄ was used instead of 0.83 mmol of TiCl₄. In this way, the isoprene block of the AFR polymer is predominately trans-polyisoprene. The polymer contained both MVP and ACN.

EXAMPLE XLIX

The same procedure given in Example XLVI is followed, except that 2.0 ml. of DMAEMA are used instead of MVP and ACN. The polymer obtained is a block polymer of cis-polyisoprene and poly-DMAEMA.

EXAMPLE L

One mmol of triisobutyl aluminum, 1 mmol of TiI₄, and 100 ml. of hexane are placed in a pressure bottle under nitrogen. The mixture is stirred while introducing butadiene to 20 p.s.i.g. pressure. Polymerization is carried out for 4 hours at room temperature while maintaining butadiene pressure at 20 p.s.i.g. At the end of this time, the bottle is depressured, and 2.0 ml. of MVP is added. After stirring for 10 minutes, 3.0 ml. of ACN is added, followed by 0.1 gram of benzoyl peroxide, and the mixture is stirred at room temperature for 8 hours. At the end of the reaction time, methanol is added to precipitate the polymer, and the polymer is recovered and washed with methanol. When vulcanized in accordance with known procedures for vulcanizing polybutadiene, a rubber is formed which exhibits the oil-resistance characteristic of nitrile rubbers but which retains the low-temperature flexibility of polybutadiene.

EXAMPLE LI

Into a pressure bottle was placed under nitrogen 100 ml. of hexane, 1 mmol of diethyl aluminum chloride, and 1 mmol of TiCl₃. The bottle was placed in a 70° C. bath and propylene was then charged to the bottle at 40 p.s.i.g. This pressure and temperature was maintained for 2 hours while stirring the contents of the bottle. The excess propylene was then bled off, and the bottle was pressured to 20 p.s.i.g. with 1,3-butadiene and was vented to 10 p.s.i.g. The procedure was repeated twice. The bottle was then repressured with 20 p.s.i.g. butadiene and was held at this pressure while stirring the contents for 1 hour, maintaining the temperature at 70° C. At the end of this time, the unreacted butadiene is bled off, and 2.0 ml. of 4-vinylpyridine (4–VP), 3.0 ml. of ACN, and 0.2 gram of benzoyl peroxide were added in that order. The mixture was then stirred at 25° C. for 16 hours. At the end of this time, methanol was added to the slurry of the polymer in hexane in order to solubilize the titanium and aluminum catalyst components, and the product was recovered by filtration, washed 3 times with methanol, and dried. The polymer was a block copolymer, one block being polypropylene, the second polybutadiene, and the third a copolymer of 4–VP and ACN. The polymer showed both ACN and 4–VP by I.R. scan. It has much better low temperature impact strength than the block copolymer of propylene not containing polybutadiene, and has the dye receptivity rating of 4.

EXAMPLE LII

The same procedure given in Example LI was followed except that only 2.5 ml. of ACN was used. The final product was a block copolymer, one block being polypropylene, the second polybutadiene, and the third poly-ACN. The polymer contained 0.5 percent of poly-ACN as shown by I.R. scan.

EXAMPLE LIII

The same procedure given in Example LII was followed except that the polypropylene-butadiene mixture was cooled in an ice-bath for 20 minutes before the addition of the 2.0 ml. of ACN. The final block copolymer contained 3.0 percent of poly-ACN.

EXAMPLE LIV

Example LI is repeated, substituting 1.0 ml. of DMAEMA and 1.0 ml. of MMA for the 4–VP and ACN. The product recovered has the dyeability of the propylene-DMAEMA-MMA block copolymer. Paint will adhere firmly to articles molded from this polymer.

EXAMPLE LV

Into a 250 ml. pressure bottle are placed, under nitrogen, 100 ml. of hexane, 1 mmol of diethyl aluminum chloride, and 1 mmol of TiCl₃. The bottle is placed in a 70° C. bath, pressured with propylene to 40 p.s.i.g. and is maintained at this temperature and pressure for 3 hours, while stirring the contents. The pressure is then dropped to 38 p.s.i.g., and the bottle is repressured with ethylene to 40 p.s.i.g., and this pressure is maintained by addition of ethylene for one half hour. The polymerization is then continued for another 20 minutes without further addition of monomer. The bottle is then depressured, and 2.0 ml. of MVP is added. After 10 minutes stirring, 3.0 ml. of ACN are added, followed by 0.2 gram of benzoyl peroxide. The mixture is then stirred at room temperature for 16 hours, after which methanol is added and the solid polymer formed is recovered by filtration, washed 3 times with methanol, and dried. The product is a block copolymer having a propylene segment, a random propylene-ethylene copolymer segment, and a MVP-ACN segment. The polymer has good dyeability and has higher low temperature impact strength than the propylene-MVP-ACN block copolymer although not quite as good as the propylene - butadiene - MVP-ACN block copolymer. Articles molded from it have, however, much higher stiffness than the latter copolymer.

EXAMPLE LVI

Into a 250 ml. pressure bottle are placed 100 ml. of hexane, 1 mmol of diethyl aluminum chloride, and 1 mmol of TiCl₃. About 15 ml. of liquid butene-1 is then added, the bottle is capped, and the contents are stirred at room temperature for 4 hours at autogeneous pressure. The bottle is then opened to release some of the unreacted butene-1, and 2.0 ml. of MVP is added. After stirring for 10 minutes, 3.0 ml. of ACN is added, followed by 0.2 gram of benzoyl peroxide. The mixture is stirred at room temperature for 16 hours, after which, methanol is added, and the solid polymer formed is recovered by filtration, and is washed 3 times with methanol. The product is a block copolymer, 1 segment of which is polybutene-1, the other copolymer of MVP and ACN. Articles molded from this polymer are resistant to the hydrocarbon solvents at temperatures in excess of 100° C., whereas unmodified polybutene-1 is not, and paints and inks adhere tenaciously to their surfaces.

EXAMPLE LVII

The general procedure for propylene polymerization described in Example I was followed and the reaction mixture cooled to room temperature. Then 1.0 ml. of 2-methyl-5-vinylpyridine, 3.0 ml. of acrylonitrile and 1.0 ml. of 2-vinylpyridine was added followed by 0.2 gram benzoyl peroxide. Then the mixture was stirred at room temperature for about 16 hours. Thereafter the polymer was recovered and washed thoroughly. Analysis indicated the presence of 4.5% acrylonitrile in the block copolymer as well as the presence of 2-methyl-5-vinylpyridine and 2-vinylpyridine. The dyeability rating of the block copolymer was 4.

EXAMPLE LVIII

Again the general procedure for propylene polymerization carried out in Example I was followed with the exception that the propylene was introduced to a pressure of 40 p.s.i.g. for a period of 2.5 hours. After cooling to room temperature, 0.07 gram of diethylene glycol was added followed by 1.0 ml. of styrene and 1.0 ml. of 4-vinylpyridine together with 0.05 gram of lauryl peroxide. Polymerization was conducted for 3 hours at room temperature. As a second step in a free radical polymerization 1.0 ml. of acrylonitrile together with 0.05 gram of cumene hydroperoxide was added and polymerization was conducted for an additional 1 hour at 70° C. The yield of the resultant block copolymer weighed 21.4 grams and the nitrogen content was 0.51% before extraction. The block copolymer had a dyeability rating of 3.

EXAMPLE LVIV

Example LVIII was repeated except that 1.0 ml. of N-vinyl 2-pyrrolidone was substituted for the styrene monomer. The yield of block copolymer was 22.6 grams and the nitrogen content was 1.18. A dyeability rating of 3+ was obtained.

The invention claimed is:

1. A substantially linear block copolymer containing two or more blocks, said copolymer containing a first block-type prepared by polymerizing a material selected from the group consisting of ethylene, propylene, 1-butene and an ethylene-propylene mixture in the absence of other monomers and in the presence of an anionic catalyst system to form a polymer which is solid, of high molecular weight and substantially crystalline and a second block-type prepared by subsequently adding and polymerizing at least one but no more than two monomers selected from the group consisting of acid-dye-receptive esters, amides or nitriles of acrylic or methacrylic compounds, vinylpyridines, alkylvinylpyridines and N-vinyl lactams in the presence of (a) initially, at least some of said anionic polymerization system and (b) a free radical initiator.

2. The copolymer of claim 1 wherein said anionic catalyst system comprises a titanium halide and an alkyl aluminum compound.

3. The copolymer of claim 1 wherein said second block-type is between about 0.1 to about 30 weight percent of the weight of said block copolymer.

4. The copolymer of claim 2 wherein said second block-type is between about 0.1 to about 30 weight percent of the weight of said block copolymer.

5. The copolymer of claim 4 wherein said first block-type is prepared by polymerizing propylene.

6. The copolymer of claim 5 wherein said second block-type is prepared by polymerizing 2-methyl-5-vinylpyridine, 4-vinylpyridine, 2-vinylpyridine, acrylonitrile, dimethylaminoethylmethacrylate and t-butylaminoethylmethacrylate.

7. The copolymer of claim 5 wherein said second block-type is prepared by polymerizing 2-methyl-5-vinylpyridine.

8. The copolymer of claim 5 wherein said second block-type is prepared by polymerizing a mixture of styrene or an alkylstyrene and a monomer selected from the group consisting of 2-vinylpyridine, 4-vinylpyridine, 2-methyl-5-vinylpyridine and acrylonitrile.

9. The copolymer of claim 5 wherein said second block-type is prepared by polymerizing a monomer selected from the group consisting of dimethylaminoethylmethacrylate and t-butylaminoethylmethacrylate.

10. The copolymer of claim 5 wherein said second block-type is prepared by polymerizing two monomers each one being selected from the group consisting of 2-methyl-5-vinylpyridine, 4-vinylpyridine, 2-vinylpyridine and acrylonitrile.

11. The copolymer of claim 5 wherein said second block-type is prepared by polymerizing a mixture of styrene or an alkylstyrene and two monomers each selected from the group consisting of 2-vinylpyridine, 4-vinylpyridine, 2-methyl-5-vinylpyridine and acrylonitrile.

12. A process of forming a substantially linear block copolymer, said copolymer containing a first block-type prepared by polymerizing a material selected from the group consisting of ethylene, propylene, 1-butene and an ethylene-propylene mixture and in the absence of other monomers and in the presence of an anionic catalyst system to form a polymer which is solid, of high molecular weight and substantially crystalline and a second block-type prepared by subsequently adding and polymerizing at least one but no more than two monomers selected from the group consisting of acid-dye-receptive esters, amides or nitriles of acrylic or methacrylic compounds, vinylpyridines and N-vinyl lactams in the presence of (a) initially, at least some of said anionic polymerization systems and (b) a free radical initiator wherein the amount of said anionic catalyst system initially present when said second block-type is formed is reduced by adding water.

13. The process of claim 12 wherein said first block-type is propylene and said anionic catalyst system comprises a titanium halide and an alkyl aluminum compound.

14. The process of claim 13 wherein said second block-type is between about 0.1 to about 30 weight percent of the weight of said block copolymer.

15. The process of claim 14 wherein said second block-type is prepared by polymerizing 2-methyl-5-vinylpyridine, 4-vinylpyridine, 2-vinyl-pyridine, acrylonitrile, dimethylaminoethylmethacrylate and t-butylaminoethylmethacrylate.

16. The process of claim 14 wherein said second block-type is prepared by polymerizing 2-methyl-5-vinylpyridine.

17. The process of claim 14 wherein said second block-type is prepared by polymerizing a mixture of styrene or an alkylstyrene and a monomer selected from the group consisting of 2-vinylpyridine, 4-vinylpyridine, 2-methyl-5-vinylpyridine and acrylonitrile.

18. The process of claim 14 wherein said second block-type is prepared by polymerizing a monomer selected from the group consisting of dimethylaminoethylmethacrylate and t-butylaminoethylmethacrylate.

19. The process of claim 14 wherein said second block-type is prepared by polymerizing two monomers each one being selected from the group consisting of 2-methyl-5-vinylpyridine, 4-vinylpyridine, 2-vinylpyridine and acrylonitrile.

20. The process of claim 14 wherein said second block-type is prepared by polymerizing a mixture of styrene or an alkylstyrene and two monomers each selected from the group consisting of 2-vinylpyridine, 4-vinylpyridine, 2-methyl-5-vinylpyridine and acrylonitrile.

References Cited

UNITED STATES PATENTS

| | | | |
|---|---|---|---|
| 3,264,374 | 8/1966 | Jones | 260—880 B |
| 3,277,210 | 10/1966 | Mirabile et al. | 260—29.6 EM H |
| 3,073,667 | 1/1963 | Bonvicini et al. | 260—878 |
| 3,149,182 | 9/1964 | Porter | 260—878 |
| 3,222,423 | 12/1965 | Roebuck | 260—878 |
| 3,265,765 | 8/1966 | Holden et al. | 260—878 |
| 3,310,605 | 3/1967 | Marans et al. | 260—878 |
| 3,399,249 | 8/1968 | Hostetler | 260—878 |
| 3,450,795 | 6/1969 | Langer | 260—878 |
| 3,453,346 | 7/1969 | Hagemeyer et al. | 260—878 |
| 3,458,598 | 7/1969 | Craven | 260—878 |
| 3,483,274 | 12/1969 | Backskai | 260—878 |

HARRY WONG, JR., Primary Examiner

U.S. Cl. X.R.

8—162; 204—159.17; 260—33.8 UA, 878 R, 879, 880 B, DIG. 43